United States Patent

[11] 3,573,587

| [72] | Inventors | Roger I. Bishop<br>Bishops Cleeve;<br>Terence J. Grimwood, Cheltenham; John L. Weston, Churchdown, England |
|---|---|---|
| [21] | Appl. No. | 858,296 |
| [22] | Filed | Sept. 16, 1969 |
| [45] | Patented | Apr. 6, 1971 |
| [73] | Assignee | Smiths Industries Limited<br>London, England |

[54] MULTIPLEX SYSTEMS
16 Claims, 2 Drawing Figs.

[52] U.S. Cl. ........................................ 318/564
[51] Int. Cl. ........................................ G05b 9/02
[50] Field of Search ............................ 318/20.075; 318/564

[56] References Cited
UNITED STATES PATENTS

| 3,156,855 | 11/1964 | Righton et al. | 318/19 |
| 3,454,852 | 7/1969 | Bourne et al. | 318/18 |
| 3,489,889 | 1/1970 | Escobosa | 318/18X |

Primary Examiner—Benjamin Dobeck
Attorneys—William D. Hall, Elliott I. Pollock, Fred C. Philpitt, George Vande Sande, Charles F. Steininger and Robert R. Priddy ABSTRACT: A triplex servocontrol channel of an aircraft flight-control system includes equalization that balances out acceptable inequalities between the three servo subchannels and involves the application degeneratively in each subchannel of two difference signals that are derived therein in accordance respectively with the differences in output as between that subchannel and the other two subchannels. The difference signals are individually limited in magnitude before application degeneratively in the respective subchannel. Each subchannel servomotor is coupled to an output gear common to the three subchannels via a torque-switch that declutches the motor from the gear under excessive torque-loading.

R.I. BISHOP
T.J. GRIMWOOD
J.L. WESTON

R. I. BISHOP
T. J. GRIMWOOD
J. L. WESTON by Hall, Pollock Vande Sande

MULTIPLEX SYSTEMS

This invention relates to multiplex systems.

The invention is particularly concerned with multiplex systems of the kind in which at least three subchannels are arranged to provide nominally equivalent outputs, and in which it is arranged that any one of the subchannels is rendered effectively inoperative in the event that there is predetermined disagreement between the value of a predetermined operational parameter of that subchannel and the values of the same operational parameter in the other individual subchannels, provision being made for balancing out operationally equivalent differences that arise between the subchannels and would otherwise result in disagreement as aforesaid. This balancing out of the acceptable differences is referred to as equalization, and examples of multiplex systems of this specified kind are described in U.S. Pat. Nos. 3,054,039 and 3,125,712 issued to D. L. Meredith on Sept. 11, 1962 and Mar. 17, 1964 respectively, and in U.S. Pat. No. 3,156,855 issued to D. W. Righton and R. J. Treadwell on Nov. 10, 1964.

It is an object of the present invention to provide an improved form of multiplex system of the kind specified.

According to the present invention a multiplex system of the kind specified includes difference means for supplying in respect of each subchannel discrete representations of the differences in the value of said parameter as between that subchannel and each other individual subchannel, said difference means including means operative to impose upon each said difference-representation limitation as to the maximum difference representable thereby, and an arrangement for balancing out operationally acceptable differences in the value of said parameter arising between the subchannels, said arrangement including equalizing means in each subchannel responsive to the said difference-representations provided in respect of that particular subchannel to act therein to balance out the differences represented by those representations.

The difference-representations provided in respect of each subchannel may be applied therein as degenerative feedback to provide a component of short term equalization. A component of longer-term equalization may be obtained in the subchannel, however, by integrating the difference-representations with respect to time and applying the accumulated integral degeneratively in that subchannel. The equalization may also involve the regulation of the overall gain of each subchannel in accordance with the difference-representations provided in respect of that subchannel. Furthermore, where the subchannels each include a servo that operates to provide an output in accordance with any difference between two signals that represent respectively desired and measured values of a variable, then the difference-representations provided in respect of that subchannel may be used to regulate degeneratively the proportional relationship between the two signals before they are applied to the servo, and in this way achieve a component of input-gain equalization in the system.

The limitation imposed upon each said difference-representation may be achieved by virtue of an inherent limitation-characteristic of the means used to derive the difference-representations, or alternatively by virtue of the use of distinct limiting means.

According to a feature of the present invention a multiplex system comprises an output member and a multiplex control-channel for driving the output member, wherein said control-channel is formed by at least three subchannels for providing nominally equivalent output drives to the output member, each said subchannel including a selectively disengageable coupling for applying the output drive of the respective subchannel to said output member, and disengaging means operable to disengage the said coupling in response to predetermined disagreement between the output drive of the respective subchannel and the output drives applied to said output member by the other subchannels, and wherein the said control-channel includes an equalizing arrangement for acting in the subchannels to balance out operationally acceptable differences arising between them, said equalizing arrangement comprising difference means for deriving in respect of each subchannel discrete representations of the differences in output drive as between that subchannel and each other individual subchannel, said difference means including means operative to impose upon each said difference-representation limitation as to the maximum difference representable thereby, and means in each subchannel for responding to the said difference-representations provided in respect of that subchannel to act therein to balance out the differences represented by those representations.

A multiplex system in accordance with the present invention will now be described, by way of example, with reference to the accompanying drawings, in which.

Figure 1:
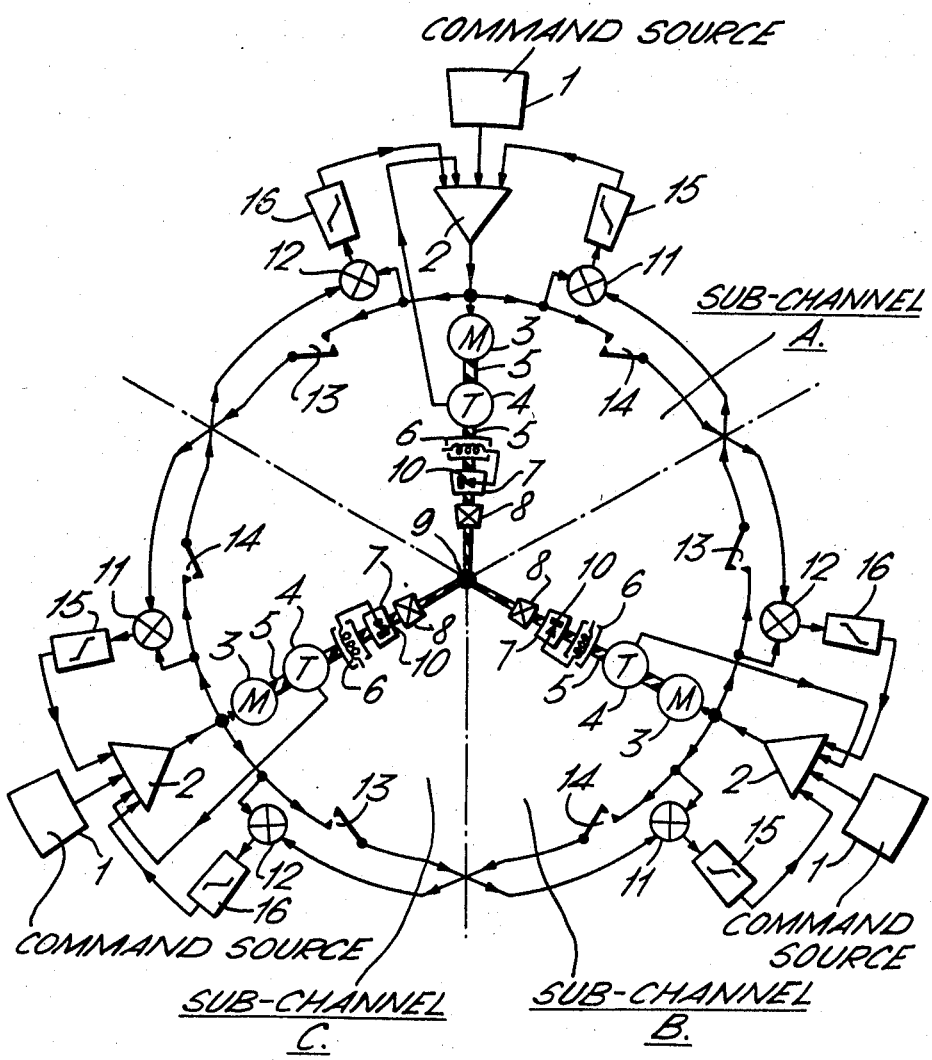
FIG. 1 is a schematic representation of the multiplex system.

The system to be described is a triplex electrical system for use in the control of one or more aerodynamic control-surfaces of an aircraft. More particularly, the system represented in FIG. 1 is one of three triplex control channels of a three-axis automatic flight-control installation of the aircraft. The three channels control respectively the elevators, ailerons and rudder of the aircraft, and of these channels the two controlling the aileron and elevator control-surfaces both have the form represented in FIG. 1.

Referring to FIG. 1 the control-channel comprises three nominally identical subchannels A, B and C that operate in parallel with one another to control together the angular setting of the relevant aileron or elevator control-surfaces (not shown). The three subchannels A, B and C control movement of the control-surfaces in accordance respectively with signals that are supplied from three nominally identical command-signal sources 1 as commands for rate of angular movement of the control-surfaces.

Each subchannel A, B and C includes an electrical servoamplifier stage 2 that receives the command signal from the relevant source 1 and energized an electrical servo motor 3 in accordance therewith. A tachogenerator 4 is coupled to the shaft 5 of the motor 3 so as to derive a signal in accordance with the rate of rotation of the shaft 5. This latter signal is supplied to the amplifier stage 2 as degenerative feedback, and in this way the rate of rotation of the shaft 5 is maintained at a value dependent upon the command signal.

The shaft 5 in each subchannel A, B and C is coupled via an electromagnetic clutch 6 to a torque-switch 7, and from there through reduction gearing 8 to a mechanical coupling point 9 common to all three subchannels A, B and C. The combined drive applied to the common point 9 by the three subchannels A, B and C acting in concert, is conveyed to the relevant control-surfaces via further reduction gearing (not shown).

Engagement of the channel to control movement of the control-surfaces automatically, is effected by operation of individual energization circuits of the electromagnetic clutches 6 in the three subchannels A, B and C. These circuits and the manner in which they operate, are described in U.S. Pat. No. 3,136,923, issued to R. J. Treadwell on Jun. 9, 1964, and it is sufficient here simply to refer to the fact that the energization circuit of the clutch 6 in each subchannel A, B and C includes electrical connection to the torque-switch 7 of that same subchannel. Each torque-switch 7 is a mechanical device that provides a substantially solid coupling between the clutch 6 and the gearing 8 of its subchannel A, B or C, as long as the torque loading on the device remains below a preset threshold level. A set of electrical contacts 10 in the device is actuated in response to sustained loading in excess of this threshold level, actuation of the set of contacts 10 breaking the energization circuit of the electromagnetic clutch 6, and thereby disengaging the subchannel from control of the control-surfaces. Examples of an assembly that combines an electromagnetic clutch with a torque-switch and is adapted to form the combination of clutch 6 and torque-switch 7 provided in each individual subchannel A, B and C of the present system, are described in U.S. Pat. No. 3,166,170 issued to D. J. Forster and N. D. Sutherland on Jan. 19, 1965, U.S. Pats. Nos. 3,530,355 and 3,529,704 both of which issued on Sept. 22, 1970, the first to J. A. Hodgkins and the second R. F. Winstone, D. Wilkinson, W. T. Scarr, C. B. Dymock and R. I. Bishop.

The torque-loading experienced by the torque-switch 6 in any one of the three subchannels A, B and C exceeds the preset threshold level if the output torque of the servomotor 3 in that particular subchannel opposes significantly the output torques of the motors 3 in the other two subchannels. These latter circumstances arise from fault conditions in the subchannel A, B or C itself, or in the equipment individually associated therewith, and the response of the torque-switch 6 then appropriately results in disengagement of the subchannel. There is, however, a tendency for differences between the output torques of the motors 3 to arise during normal operation from inherent differences between nominally identical components used in the three subchannels A, B and C, and between the nominally identical signals applied therein. Equalization to balance out these acceptable differences and thereby avoid unnecessary disengagement of any of the subchannels A, B and C, is provided in dependence upon the output torques of the motors 3. In particular, equalization is provided in dependence upon the energization voltages supplied to the motors 3 by their respective amplifier stages 2, the voltage in each case providing a measure of the torque exerted by the relevant motor 3. Each subchannel A, B and C includes two comparator devices 11 and 12 that serve respectively to compare the output signal of the amplifier stage 2 in their subchannel with the corresponding signals in the other two subchannels. In the latter respect, the output signal of the stage 2 in the subchannel, in addition to being supplied to the two devices 11 and 12, is supplied to corresponding devices 11 and 12 in the other two subchannels via sets of contacts 13 and 14 respectively, that both remain closed while the subchannel is engaged. The set of contacts 13 of each subchannel control the application of the signal to the comparator device 11 of the subchannel which is preceding in the cyclic order A, B, C, whereas the set of contacts 14 control the application of the signal to the comparator device 12 of the succeeding subchannel. The devices 11 and 12 in each case derive a signal representative of the difference between the individual pair of signals compared thereby.

The difference-signals derived by the devices 11 and 12 in each subchannel A, B and C are supplied to limiters 15 and 16 respectively, and as independently limited thereby, provide the basic components of the equalization applied in that individual subchannel. In particular, these two component-signals are applied from the limiters 15 and 16 to the amplifier stage 2 of the subchannel, the sense of application in each case being such as to reduce the represented difference. The form of equalization applied in this latter respect acts specifically to correct for short term differences between the datum voltage-levels of the individual energization signals supplied from the amplifier stages 2 to the motors 3, that is to say, to correct for those differences that as between the different motor-energization signals result from short term variations in the notional zero-levels of those signals.

In addition to the short term datum equalization indicated above, three other forms of equalization, namely longterm datum equalization, gain equalization, and input equalization, are provided in each subchannel. The specific means by which these other forms of equalization are achieved, are not indicated in FIG. 1 for the sake of simplicity, but are described later in relation to FIG. 2. However, the relevant form of equalization is achieved in each case in accordance with the combination of the two independently limited difference-signals supplied from the limiters 15 and 16 of the subchannel concerned. This use of both signals is of particular significance in reducing the likelihood of the wrong subchannel being disengaged in the event of a fault in any one of the subchannels A, B and C.

The effect of a fault occurring in any one of the subchannels A, B and C operating in triplex is required to be such as to result in disengagement of that particular, faulty subchannel, together with continuation of operation of the two remaining subchannels in duplex. A fault in either of the remaining subchannels causes both to disengage, and disengagement of the system as a whole in this way, will be a natural consequence if a subchannel other than the faulty one is disengaged in the change from triplex to duplex operation. Reduction of the likelihood that a subchannel other than the faulty one, is disengaged in the change from triplex to duplex operation, accordingly increases the reliability of the system as a whole, there being less likelihood of a fault in a single subchannel producing by itself disengagement of the system as a whole, rather than just change to duplex operation of the two nonfaulty subchannels.

In the latter respect, operation of the system of FIG. 1 can be analyzed by reference to the output voltages $V_A$, $V_B$ and $V_C$ of the amplifier stages 2 in the subchannels A, B and D respectively, and the equalization voltages $E_A$, $E_B$ and $E_C$ applied to the stages 2 in those respective subchannels. The output voltages $V_A$, $V_B$ and $V_C$ are related to the input-command voltages $D_A$, $D_B$ and $D_C$, and to the feedback voltages $T_A$, $T_B$ and $T_C$ from the tachogenerators 4, of the respective subchannels, as:

$$VA = G(D_A - T_A + E_A) \quad (1)$$
$$VB = G(DB - T_B + E_B) \text{ torque-switch} \quad (2)$$
$$VC = G(D_C - TC + E_C) \quad (3)$$

where G is the gain involved. The equalization voltages $E_A$, $E_B$ and $E_C$ are given, for the linear regime, as:

$$E_A = K[(V_B - V_A) + (V_C - V_A)] \quad (4)$$
$$E_B = K[(V_C - V_B) + (V_A - V_B)] \quad (5)$$
$$E_C = K[(V_A - VC) + (V_B - V_C)] \quad (6)$$

where K is a gain factor.

For simplicity in solution of equations (1) to (6) it can be assumed that:

a. $T_A = T = T_C = T$; this presumes direct mechanical interconnection of the output shafts of the motors 3, and identical sensitivities for the tachogenerators 4.

b. $V_A + V + V_C V_L$; this presumes a stable equilibrium for which the effective output torque of the system has a voltage-equivalent $V_L$.

c. G approaches an infinite value.

With these assumptions, equations (1) to (3) can be rewritten using equations (4) to (6), as:

$$V_A = [V_L + (2DA - _B - D_C)/3K]/3 \quad (7)$$
$$V_B = [V_L + (-D_A + 2D_B - D_C)/3K]/3 \quad (8)$$
$$V_C = [V_L + (-D_A - D_B + D_C)/3K]/3 \quad (9)$$

The amplifier output voltages $V_A$, $V_B$ and $V_C$ as defined by equations (1) to (3) are exactly the same as those derived in the earlier form of triplex system described in the above-mentioned U.S. Pat. No. 3,156,855. With the form of system described in U.S. Pat. No. 3,156,855 the equalization voltage of each subchannel is, however, derived simply from the difference between the output voltage of the servoamplifier stage of that subchannel and the output voltage of the servoamplifier stage in the next subchannel taking the subchannels in cyclic order. The equations corresponding to equations (4) to (6), for the equalization voltages $E_A$, $E_B$ and $E_C$ with this earlier, cyclic equalization are:

$$E_A = K(V_B - V_A) \quad (10)$$
$$E_B = K(V_C - V_B) \quad (11)$$
$$E_C = K(V_A - V_C) \quad (12)$$

so that in this case the equations corresponding to equations (7) to (9) are:

$$V_A = [VL + (D_A - D_C)/K]/3 \quad (13)$$
$$V_B = [V_L + D_B - D_A)/K]/3 \quad (14)$$
$$V_C = [V_L + D_C - D_B)/K]/3 \quad (15)$$

Comparison of the set of equations of (7) to (9) with the set of equations (13) to (15) indicates that there is a greater sharing of the commands ($D_A$, $D_B$ and $D_C$) between the three subchannels with the symmetrical equalization of the system shown in FIG. 1, than with the cyclic equalization of the earlier system. The set of equations (7) to (9) shows that the loading created by each command is effectively shared between all three subchannels with the present system whereas, as shown by the set of equations (3) to (15) it is shared effectively between only two.

The difference between the two systems in the sharing of the commands $D_A$, $D_B$ and $D_C$, whilst not of any great significance during normal operation, is of importance in the event of a fault in the operation of any one of the subchannels. For example, considering the circumstances in which the value of the equivalent-voltage $V_L$ is zero and a fault condition arises in, say, the subchannel A such that the command voltage $D_A$ assumes the value N, whereas the command voltages $D_B$ and $D_C$ both remain zero, then equations (7) to (9) for symmetrical equalization become:

$V_A = [2N/3K]/3$
$V_B = [-N/3K]/3$
$V_C = [-N/3K]/3$ and equations (13) to (15) for cyclic equalization become:

$V_A = [N/K]/3$
$V_B = [-N/K]/3$
$V_C = A[0]/3$

It is clear from these two sets of equations that with cyclic equalization, reaction against the runaway in command voltage $D_A$ is provided outside subchannel A, solely by subchannel B. With the symmetrical equalization of the present invention, however, reaction is provided by the other two subchannels B and C acting in concert and to the same extent as one another. The likelihood of either subchannel B or C being disengaged instead of the faulty subchannel A is clearly reduced with the symmetrical equalization.

Details of construction of each subchannel A, B and C, using the symmetrical equalization of the present invention will now be described with reference to FIG. 2. This FIG. shows the details of subchannel A alone, but the other two subchannels are of exactly the same form.

Figure 2:
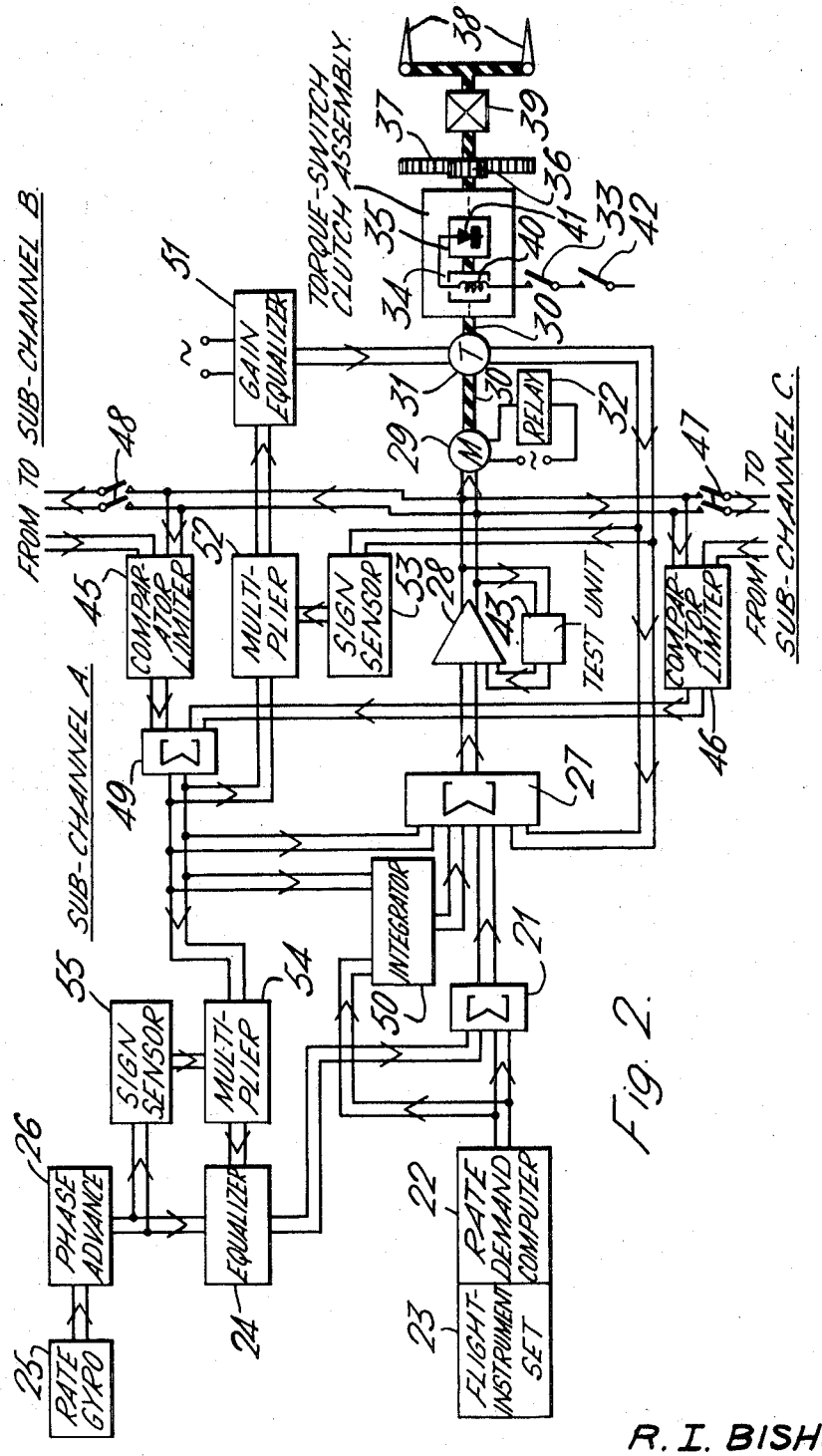
FIG. 2 is a schematic representation in greater detail, of one of three subchannels of the system of FIG. 1.

Referring to FIG. 2, the command signal applied in the subchannel A is derived by a signal-combining circuit 21 in dependence upon a maneuver-demand signal that is supplied by a demand computer 22. The maneuver-demand signal is representative of a demanded rate of angular movement of the aircraft about the relevant control axis of the aircraft (the pitch or roll axis according to whether the channel controls the elevator or aileron control-surfaces), and is derived by the computer 22 in accordance with signals supplied by a respective set 23 of flight instruments.

The flight-instrument set 23 includes, inter alia, a vertical gyroscope, radio navigation receivers and a radio altimeter, and the signals supplied by the instruments of the set are utilized selectively in the demand computer 22 according to the setting of a flight-controller (not shown). The flight-controller, which is common to all three subchannels A, B and C, is set by the pilot in accordance with the mode of flight desired of the aircraft, and in the computer 22 is associated with a switching circuit that is switchable from one to another of a plurality of states to change the mode of operation of the respective computer 22. When, for example, the flight-controller is set by the pilot to select automatic landing of the aircraft, each switching circuit is thereby primed ready to execute a switching sequence in which the successive steps of the sequence take place as the aircraft descends through successive height-levels above the ground. The automatic landing maneuver is executed in discrete phases that follow on one after the other as the aircraft descends through these height-levels, and once the maneuver is initiated by the pilot, so the successive steps of the switching sequence bring about the changes from one phase to another in the operational mode of the demand computer 22. The control law according to which the demand is derived is changed from one phase to another by the switching operation, the descent of the aircraft to the appropriate height-level for the change, being detected in each case by reference to the output signal of the radio altimeter in the relevant flight-instrument set 23. Details of suitable switching circuits, and the manner in which they operate and are coordinated to one another so that switching takes place simultaneously in the demand computers of the three subchannels A, B and C, are described in U.S. Pat. No. 3,190,586, issued to D. W. Righton on Jun. 22, 1965.

The demand signal applied to the signal-combining circuit from the computer 22 is opposed in the circuit 21 by the output signal of an equalizer 24. The output signal of the equalizer 24 is dependent upon a signal derived by a rate gyro 25 that is mounted in the aircraft to sense the actual rate of angular movement of the aircraft about the control axis. The signal derived by the rate gyro 25 is representative of the rate of this angular movement and is applied to the equalizer 24 via a phase-advancing network 26. The signal derived by the circuit 21 from the difference between the output signals of the computer 22 and equalizer 24, being dependent upon the difference between the demanded and actual rates of angular movement, is supplied as the command signal to a further signal-combining circuit 27. The output signal of the circuit 27 is applied via a servoamplifier 28 to energize the control-phase winding of a two-phase servo motor 29 of the subchannel. A signal dependent upon the rate of rotation of the shaft 30 of the motor 29 is applied to the signal-combining circuit 27 as degenerative rate-feedback, from a tachogenerator 31 coupled to the shaft 30.

A relay 32 is energized in series with the reference-phase winding of the motor 29 so that a set of contacts 33 of the relay 32 remains closed only while energization-current is being supplied to the motor 29. The set of contacts 33 is connected in the energization circuit of an electromagnetic clutch 34 that in assembly with a torque-switch 35, couples the shaft 30 to an individual pinion 36 engaging with a gearwheel 37. The gearwheel 37 is common to all three subchannels A, B and C, and serves to combine the drives from the three subchannels A, B and C for application to the appropriate aerodynamic control-surfaces 38 via reduction gearing 39.

An electrical winding 40 of the clutch 34 is connected in the clutch-energization circuit in series with the set of contacts 33, a set of contacts 41 of the torque-switch 35, and a further set of contacts 42. A test-signal injector-detector unit 43 that is connected between the output and input of the servoamplifier 28 maintains the set of contacts 42 closed only while the amplifier 28 is operative to energize the motor 29. The unit 43 injects a small signal into the amplifier 28 at the input and maintains the set of contacts 42 closed only so long as it continues to detect the appearance of the injected-signal at the output.

The output signal of the servoamplifier 28 is supplied to each of two comparator-limiter units 45 and 46, and also to the corresponding units in the subchannels C and B via sets of contacts 47 and 48 respectively. The unit 45 receives the output signal of the servoamplifier of subchannel B and derives a signal in accordance with the difference between this and the output signal of the amplifier 28. The unit 46, on the other hand, receives the output signal of the servoamplifier of the subchannel C and derives a signal in accordance with the difference between this and the output signal of the amplifier 28. The signals derived by the units 45 and 46 are both limited in magnitude (the limits imposed being the same in the two cases), and are added together by a signal-combining circuit 49 to provide the basic equalization signal of the subchannel A.

Short term datum equalization is provided in the subchannel by application of the combined output signal of the circuit 49 directly to the signal-combining circuit 27. Longterm datum equalization, on the other hand, is provided by application to the circuit 27 of the output signal of an integrator circuit 50 that is supplied with the output signal of the circuit 49. The integrator circuit 50 is also supplied with the output signal of the demand computer 22 so that the signal supplied to the circuit 27 from the integrator circuit 50 is representative of the integral with respect to time of the additive combination of the signals from the computer 22 and the circuit 49. Thus, in addition to including a component providing a longterm datum equalization, the signal supplied from the integrator circuit 50 includes a component providing a measure of long-term monitoring. The monitoring provided in this latter respect acts to obviate datum-drift which would otherwise occur in the command signal applied to the circuit 27 in the event of a change from zero in the normal datum level of the demand signal derived by the computer 22.

Gain equalization is provided in the subchannel by application of the combined output signal of the circuit 49 to a gain-equalizer 51 associated with the tachogenerator 31. The signal from the circuit 49 is supplied to the gain-equalizer 51 via a multiplier circuit 52, the multiplier circuit 52 effecting a reversal of sense of this signal according to the sense of the output signal of the tachogenerator 31 as detected by a sign-sensor circuit 53. The gain-equalizer 51 regulates the alternating-current energization of the tachogenerator 31 in accordance with the signal supplied from the multiplier circuit 52. In this respect, the gain-equalizer 51 causes the amplitude of the energization voltage to depart from a normal nonzero datum value by an amount dependent upon the magnitude of the signal from the multiplier circuit 52, and in a sense dependent upon the sense of that signal. The gain-equalizer 51 accordingly acts to regulate the degree of degenerative rate-feedback, and therefore the overall gain of the servo, in accordance with the equalization signal supplied by the circuit 49. The gain is increased or decreased in dependence upon the sense of the feedback, which in general corresponds to the sense of the output signal of circuit 27, such as to tend to reduce the output signal of the circuit 49.

Finally, input-gain equalization is provided in the subchannel by application of the output signal of the circuit 49 to the equalizer 24 via a multiplier circuit 54. The multiplier circuit 54 effects reversal of the sense of the signal from the circuit 49 according to the sense of the output signal of the phase-advance network 26 as detected by a sign-sensor circuit 55. The equalizer 24 regulates the level of signal supplied from the network 26 to the signal-combining circuit 21, and in this respect acts to provide variable gain between the network 26 and circuit 21, the gain departing form a nominal unit-value to an extent and in a sense dependent upon the magnitude and sense dependent upon the magnitude and sense respectively of the signal from the multiplier circuit 54. The equalizer 24 accordingly acts to regulate the proportionality between the signal supplied to the circuit 21 and the rate of angular movement sensed by the rate gyro 25, and this correspondingly modifies the relationship between this signal and the demand signal supplied by the computer 22. The proportionality is increased or decreased in the appropriate sense relative to that of the signal from the network 26, to reduce the output signal of the circuit 49.

Although in the system of FIG. 2, input equalization is effected by regulation of the signal applied to the circuit 21 from the network 26, it may alternatively, or in addition, be effected by regulation of the signal applied to the circuit 21 from the computer 22. In either instance, an equalizer corresponding to the equalizer 24 is connected between the computer 22 and circuit 21, and a sign-sensor circuit corresponding to the sign-sensor circuit 55 is provided to respond to the sense of the output signal of the computer 22.

Gain equalization may be effected in the system of FIG. 2 by connecting the equalizer 51 in the rate-feedback path between the tachogenerator 31 and the circuit 27 (rather than in the energization circuit as shown) so as to regulate the gain of this path. Alternatively, the equalizer 51 may be connected in the manner of a variable-gain preamplifier to amplify a combined form of the output signals of the circuits 21, 49 and 50, before these are combined in the circuit 27 with the degenerative rate-feedback signal from the tachogenerator 31.

We claim:

1. In a multiplex system having at least three subchannels operable to provide respective outputs that are nominally equivalent to one another, and including means for rendering any one of the subchannels effectively inoperative in the event that there is predetermined disagreement between the value of a predetermined operational parameter of that subchannel and the values of the same operational parameter in the other individual subchannels, the combination comprising:

difference means for supplying in respect of each subchannel discrete representations of the differences in the value of said parameter as between that subchannel and each other individual subchannel, said difference means including means operative to impose upon each said difference-representation limitation as to the maximum difference representable thereby;

further means for balancing out operationally acceptable differences in the value of said parameter arising between the subchannels;

said further means comprising equalizing means in each subchannel;

signal supply means to apply to the equalizing means in each individual subchannel the said difference-representations supplied by said difference means in respect of that particular subchannel; and each said equalizing means being means responsive to the said difference-representations applied thereto to act in its respective subchannel to balance out the differences represented by those representations.

2. A multiplex system according to claim 1 wherein the said equalizing means in each subchannel includes means for applying the difference-representations provided in respect of that subchannel as degenerative feedback therein.

3. A multiplex system according to claim 1 wherein the said equalizing means in each subchannel includes an integrator for integrating with respect to time the difference-representations provided in respect of that subchannel, and means for applying the accumulated integral degeneratively in the respective subchannel.

4. A multiplex system according to claim 1 wherein the said equalizing means in each subchannel includes controllable means for varying the overall gain of the subchannel, and means for applying the difference-representations provided in respect of that subchannel to said controllable means to regulate the gain of the respective subchannel degeneratively.

5. A multiplex system according to claim 1 wherein each subchannel includes a servo, means for deriving a first signal in accordance with a desired value of a predetermined variable, means for driving a second signal in accordance with a measured value of said variable, and signal-transmission means for transmitting said first and second signals to the servo, said servo being responsive to the signals transmitted thereto by said signal-transmission means to provide an output in accordance with any difference therebetween, and said signal-transmission means including controllable means for varying the proportional relationship between the said first and second signals in their transmission to the said servo, and means for applying the difference-representations provided in respect of the respective subchannel to said controllable means to regulate degeneratively the said proportional relationship.

6. A multiplex system comprising an output member and a multiplex control-channel for driving the output member, wherein said control-channel is formed by at least three subchannels for providing nominally equivalent output drives to the output member, each said subchannel including a selectively disengageable coupling for applying the output drive of the respective subchannel to said output member, and disengaging means operable to disengage the said coupling in response to predetermined disagreement between the output drive of the respective subchannel and the output drives applied to said output member by the other subchannels, and wherein the said control-channel includes equalizing means or acting in the subchannels to balance out operationally acceptable differences arising between them, said equalizing means comprising difference means for deriving in respect of each subchannel discrete representations of the differences in output drive as between that subchannel and each other individual subchannel, said difference means including means operative to impose upon each said difference-representation limitation as to the maximum difference representable thereby, and means in each subchannel for responding to the said difference-representations provided in respect of that subchannel to act therein to balance out the differences represented by those representations.

7. A multiplex system according to claim 6 wherein said difference means comprises, in each subchannel, comparator means for deriving signals representative respectively of the differences in output drive as between that subchannel and each other individual subchannel, and distinct signal-limiters for imposing upon the derived signals individually a predetermined limitation as to the maximum difference representable thereby.

8. A multiplex system according to claim 6 wherein each subchannel comprises a servo motor to provide the output drive of the respective subchannel, a servoamplifier stage for supplying a signal to energize the servomotor, a plurality of signal-comparators for comparing the energizing signal of that subchannel with respectively the corresponding energizing signals of all the other subchannels to derive signals dependent upon any differences therebetween, and feedback means for applying degenerative feedback in the respective subchannel, said feedback means including means for providing a component of said feedback in accordance with the signals derived by the signal-comparators of the subchannel.

9. A multiplex system according to claim 8 wherein said feedback means of each subchannel includes an integrator for deriving a signal dependent upon the integral with respect to time of the signals derived by the said signal-comparators of that respective subchannel, and means for supplying the signal derived by the integrator to the servoamplifier stage of the respective subchannel as a component of said degenerative feedback.

10. A multiplex system according to claim 8 wherein the said feedback means in each subchannel includes means for providing degenerative feedback in accordance with the drive provided by the servomotor of the respective subchannel, and means for varying the degree of this latter feedback in accordance with the signals derived by the said signal-comparators of the subchannel.

11. A multiplex system according to claim 8 wherein each subchannel includes means for deriving a demand-signal in accordance with a desired value of a predetermined variable means for deriving a measurement-signal in accordance with a measured value of said variable, and signal-transmission means for applying the demand- and measurement-signals to said servoamplifier stage in opposition to one another, said signal-transmission means including controllable means for varying the proportional relationship between the said demand- and measurement-signals before their application to said servoamplifier stage, and means for applying the signals derived by the said signal-comparators of the subchannel to said controllable means to regulate degeneratively the said proportional relationship.

12. A multiplex system according to claim 6 for use in control of at least one aerodynamic control-surface of an aircraft, the system including at least three command-generating means for generating nominally equivalent commands for rate of control-surface movement, and means for applying the commands derived by the different command-generating means to different ones of said subchannels, each subchannel being responsive to the command applied thereto to provide output drive in accordance with the commanded rate.

13. A multiplex system comprising a rotatable output member and a multiplex control-channel for controlling rotation of the output member, wherein said control-channel is formed by at least three subchannels for applying nominally equivalent output torques to the output member and includes equalizing means for acting in the subchannels to balance out operationally acceptable differences arising between them, and wherein each subchannel includes an electrical servomotor for providing the output torque of the respective subchannel, an electrical servoamplifier for supplying an electric signal to energize the servomotor a selectively disengageable clutch, a torque-switch for disengaging the clutch in response to application to the torque-switch of a torque-loading in excess of a predetermined threshold level, means for applying the output torque provided by the motor to said output member via said clutch and torque-switch in series, a plurality of signal-comparators for comparing the energizing signal of the subchannel with the corresponding energizing signals respectively of all the other subchannels To derive signals representative of the differences between the compared signals, means or effecting limitation as to the maximum magnitude of difference representable by each derived difference-signal, and means for applying the difference signals degeneratively in the respective subchannel.

14. A multiplex system according to claim 13 for use in control of at least one aerodynamic control-surface of an aircraft, the system including at least three command-generating means for generating nominally equivalent commands for rate of control-surface movement, and means for applying the commands derived by the different command-generating means to different ones of said subchannels, each subchannel being responsive to the command applied thereto to provide output drive in accordance with the commanded rate.

15. In an aircraft having a movable aerodynamic control-surface for use in maneuvering the aircraft during flight:
a multiplex control-channel to provide drive for moving the control-surface, and drive-transmission means intercoupling the multiplex control-channel and the control-surface to move the control-surface in accordance with said drive applied from the multiplex control-channel;
said multiplex control-channel comprising at least three sub-channels for applying nominally equivalent output drives to said drive-transmission means;
each said subchannel including a selectively disengageable coupling for applying the output drive of the respective subchannel to said drive-transmission means;
disengaging means operable to disengage the said coupling in response to predetermined disagreement between the output drive of the respective subchannel and the output drives applied to said drive-transmission means by the other subchannels, and wherein the said control-channel includes equalizing means for acting in the subchannels to balance out operationally acceptable differences arising between them;
said equalizing means comprising difference means for deriving in respect of each subchannel discrete representations of the differences in output drive as between that subchannel and each other individual subchannel;
said difference means including means operative to impose upon each said difference-representation limitation as to the maximum difference representable thereby; and
means in each subchannel for responding to the said difference-representations provided in respect of that subchannel to act therein to balance out the differences represented by those representations.

16. In an aircraft having a movable aerodynamic control-surface for use in maneuvering the aircraft during flight:
a multiplex control-channel to provide torque for moving the control-surface;
torque-transmission means intercoupling the multiplex control-channel and the control-surface to move the control-surface in accordance with torque applied from the multiplex-control channel;
said multiplex control-channel comprising at least three sub-channels for applying nominally equivalent output torques to the torque-transmission means and including equalizing means for acting in the subchannels to balance out operationally acceptable differences arising between them;
wherein each subchannel includes an electrical servomotor for providing the output torque of the respective subchannel;

an electrical servoamplifier for supplying an electric signal to energize the servomotor;

a selectively disengageable clutch;

torque-switch for disengaging the clutch in response to application to the torque-switch of a torque-loading in excess of a predetermined threshold level;

means for applying the output torque provided by the motor to said torque-transmission means via said clutch and torque-switch in series;

a plurality of signal-comparators for comparing the energizing signal of the subchannel with the corresponding energizing signal respectively of all the other subchannels to derive signals representative of the differences between the compared signals;

means for effecting limitation as to the maximum magnitude of difference representable by each derived difference-signal; and means for applying the difference-signals degeneratively in the respective subchannel.

PO-1050
(5/69)

UNITED STATES PATENT OFFICE
CERTIFICATE OF CORRECTION

Patent No. 3,573,587     Dated April 6, 1971

Inventor(s) Roger I. Bishop, Terence J. Grimwood, and John L.

It is certified that error appears in the above-identified patent and that said Letters Patent are hereby corrected as shown below:

[32] Priority Sept. 17, 1968
Great Britain
44071/68

Signed and sealed this 5th day of October 1971.

(SEAL)
Attest:

EDWARD M. FLETCHER, JR.          ROBERT GOTTSCHALK
Attesting Officer                 Acting Commissioner of Pat